United States Patent [19]

Sidor

[11] 3,917,997

[45] Nov. 4, 1975

[54] MAGNETIC FLUX CLOSURE MEMBER FOR AN ANGULAR VELOCITY SENSING DEVICE

[75] Inventor: Edward F. Sidor, Lombard, Ill.

[73] Assignee: Illinois Tool Works Inc., Chicago, Ill.

[22] Filed: Sept. 20, 1974

[21] Appl. No.: 507,828

[52] U.S. Cl. ................ 324/166; 322/29; 324/174; 340/195
[51] Int. Cl.² ........................................ G01P 3/48
[58] Field of Search .......... 324/160, 166, 167, 173, 324/174, 176, 34 PS, 34 D, 34 GT, 34 TK; 322/29, 31; 340/263, 195, 196

[56] References Cited
UNITED STATES PATENTS

| | | | |
|---|---|---|---|
| 2,703,384 | 3/1955 | Rendel | 324/34 TK |
| 2,867,118 | 1/1959 | Cavanagh | 324/34 R |
| 3,855,525 | 12/1974 | Bernin | 324/173 |

*Primary Examiner*—Robert J. Coccoran
*Attorney, Agent, or Firm*—Robert W. Beart; Glenn W. Bowen

[57] ABSTRACT

A sensing device with improved sensitivity for sensing the velocity of a rotating magnetizable wheel is disclosed. The sensing device utilizes two closed-loop magnetic cores and four inductive windings which are interconnected to form a four-arm active bridge circuit, all arms of which are affected by the rotating wheel. A permanent magnet biases the two magnetic cores to partial saturation and also supplies magnetic flux to the rotating wheel. In one version, two windings are wound around each of the cores. In another version, one winding is wound around each of the cores; and a separate magnetic member that provides a return path for the bias magnetic flux that passes through the cores has two apertures at its ends and each of the other two windings is wound through one of these apertures.

1 Claim, 5 Drawing Figures

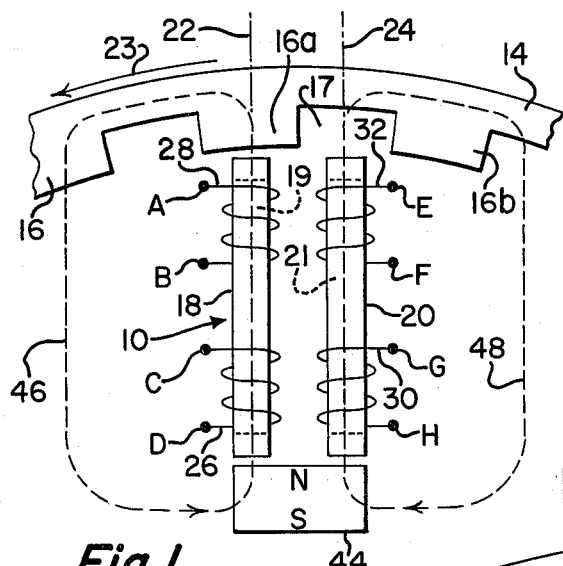
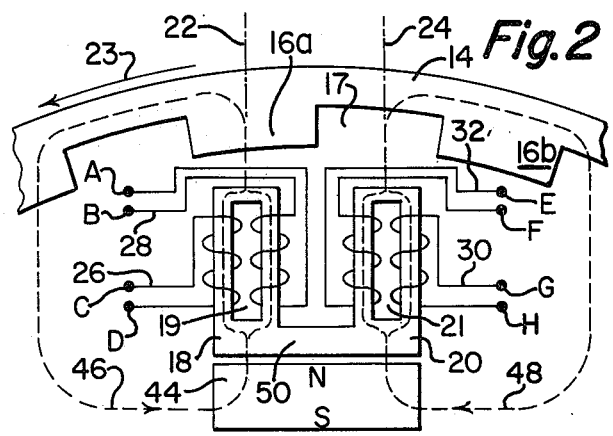
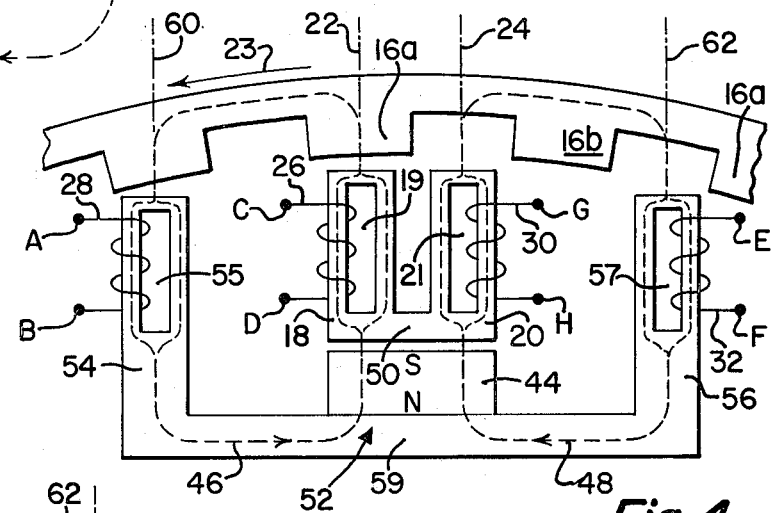
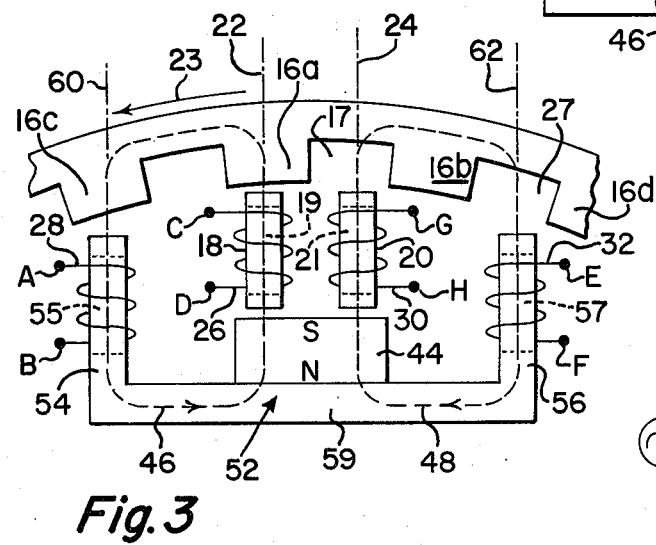
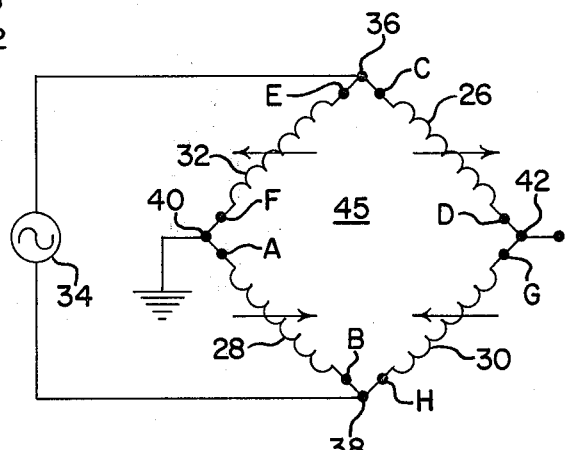
Fig. 1
Fig. 2
Fig. 4
Fig. 3
Fig. 5

MAGNETIC FLUX CLOSURE MEMBER FOR AN ANGULAR VELOCITY SENSING DEVICE

BACKGROUND OF THE INVENTION

Several types of sensing devices are known for detecting the velocity of a rotating magnetizable tone wheel or disc having teeth on its periphery. As the wheel rotates, a varying magnetic flux is established adjacent its periphery. The variation in the magnetic field created by the rotating wheel has, in the past, been generally detected by two different types of detectors.

Probably the most common type of detector that has been employed generates a voltage that is a function of the speed of rotation of the rotating wheel. The rate sensitivity of this type of sensing device is a serious deficiency for many applications, particularly automotive anti-skid systems for example. This is due to the fact that the output signal decreases with speed to such an extent that it places a lower speed limit on the anti-skid system, which greatly decreases the practicality of such a system.

Another type of rotational speed sensor for sensing a magnetic field variation created by a rotating member which relies on sensing the change of inductance that occurs in a magnetic core is shown in Favre U.S. Pat. No. 3,505,595. In the sensing device of the Favre patent, a high frequency excitation voltage is supplied to a winding on an elongated core, and a change of inductance is caused by a varying magnetic field created by the rotating member. However, with such a device, the sensitivity will be relatively low due to the open flux path of the core member.

One type of sensing device for achieving the desired sensing is shown and described in United States patent application, Ser. No. 404,062, now U.S. Pat. No. 3,855,525, which was filed Oct. 5, 1973, in the name of Victor M. Bernin and is assigned to the assignee of the present invention. In the sensing device described in the Bernin application, a pair of magnetic closed-loop cores are each wound with one winding; and they are coupled so as to receive opposite phase carrier signals. The inductive windings on the cores are also interconnected to form a two-arm active bridge circuit having a balanced output network consisting of a pair of fixed resistors. The two cores of the sensor of the Bernin application are spaced apart so that the centerline of one core will be in alignment with the centerline of a tooth on the wheel when the centerline of the other core is in alignment with the space between that tooth and the next succeeding tooth. The magnetizable wheel or gear is made of a magnetic material which is not permanently magnetized, such as "soft" iron; and a permanent magnet is placed adjacent to two cores to partially saturate the two cores and to supply magnetic flux to the rotating wheel.

While the sensing device of the Bernin application is useful for many applications, it is desirable to have improved sensitivity for such sensors; and it is, therefore, the object of the present invention to provide a wheel velocity sensing device having substantially improved sensitivity.

DESCRIPTION OF THE DRAWINGS

FIG. 1 is a diagrammatic representation of one version of the sensor of the present invention in which two windings of the four-arm inductive bridge are wound around each of the cores of the sensor;

FIG. 2 is an improved embodiment of the version of FIG. 1 in which the two cores of the sensor are formed of a single piece of magnetic core material;

FIG. 3 is a diagrammatic representation of a second form of the sensor of the present invention in which each of the cores are wound with only one winding of the four-arm active bridge, while a return path magnetic member which bridges the cores and has two apertures at its ends is wound with the other two windings;

FIG. 4 is a diagrammatic representation of an improved embodiment of the version of FIG. 3 in which the two cores are formed of a single piece of magnetic core material; and FIG. 5 is a schematic representation of a four-arm active bridge sensing circuit that is employable with the structures of FIGS. 1 through 4.

TECHNICAL DESCRIPTION OF THE INVENTION

A sensing device for sensing the motion of a rotating member is indicated generally by the reference numeral 10 of FIG. 1. The rotating wheel 14 is preferably formed of a "soft" iron magnetic material which is not permanently magnetized, and it has a plurality of teeth 16 on its periphery. The teeth in FIG. 1 are shown as being formed on the inner periphery of the wheel 14, but the invention is equally applicable for teeth formed on the outer periphery of a wheel. Unmagnetized wheels are preferred to magnetized wheels because they are much less expensive.

A pair of closed-loop, toroidal-shaped magnetic cores 18, 20 are positioned adjacent the innermost edges of the teeth 16. In FIG. 1, the edges of the toroidal-shaped cores 18, 20 are shown; and they are positioned so that their central apertures 19, 21 are represented by dotted lines. When the centerline 22 of the core 18 is in alignment with the center of the tooth 16a, the centerline 24 of the edge of the core 20 will be in alignment with the center of the space 17 between the tooth 16a and the next tooth 16b that will pass by the cores 18, 20 when the wheel is rotating in the direction of the arrow 23. The windings 26 and 28 are both wound on the core 18; and the windings 30,32 are both wound on the core 20, as shown in FIG. 1. The windings 26,28,30,32 are interconnected, as shown in FIG. 5, to form a four-arm active bridge circuit 45 in which each of the windings 26,28,30,32 are affected by rotation of the wheel 14. An oscillator 34 is coupled across the terminals of the bridge circuit 36,38. The terminal 40 is grounded and the output is taken across the terminals 40,42. The terminal ends of the coil 28 are labelled A and B. The terminal ends of the coil 26 are labelled C and D; those of the coil 32 are labelled E and F, while the terminal ends of the coil 30 are labelled G and H in both FIGS. 1 and 5. In FIG. 5 it is seen that the ends A and F are connected to the grounded terminal 40; the ends E and C are connected to the terminal 36; the ends B and H are connected to the terminal 38; and the ends D and G are connected to the output terminal 42.

The magnetic flux that is generated in the cores 18,20 due to the alternating current source 34 is confined largely within the closed-loop structure of the cores. If the rotating wheel 14 is made of a magnetic material, such as "soft" iron, it is necessary to supply a bias magnetic field. This can be achieved by positioning a bias magnet 44 adjacent the cores 18,20. If a permanent magnet wheel is used, the bias magnet is not necessary; but the cores 18,20 could be biased by a magnet even if the rotating wheel 14 had some permanent magnetism, if desired. The magnetic flux from the biasing magnet 44 of FIG. 1 goes through the core 18, the teeth of the wheel 14, and back to the magnet 44 through the air, as shown by the dotted lines 46,48 which represent the magnetic flux paths. As the rotating wheel 14 revolves in the direction of the arrow 23, modulation of the carrier signal impressed on the bridge circuit 45 by the oscillator 34 results from the interaction of moving teeth 16 and the cores 18,20. The modulated output signal appears across the terminals 42,40 so as to provide an indication of the velocity of the rotating wheel 14 to a remote location.

A major advantage of the sensing device of the present invention over the wheel sensing devices of the previously mentioned Bernin application is that the sensor of the present invention utilizes a four-arm active bridge circuit; and the output of this sensor, therefore, will be approximately double that obtainable from the sensor of the Bernin application. The sensing device of the present invention also has an additional consequent advantage in that the output voltage tends to remain a constant percentage of the input voltage whenever there is a change in temperature.

The embodiment shown in FIG. 2 is functionally the same as the embodiment shown in FIG. 1, and it is labelled with the same reference numerals. The schematic of FIG. 5, therefore, also applies to this embodiment. Although the magnetic cores 18,20 of FIG. 2 are generally rectangular and are positioned in a 90° rotated position with respect to the orientation of the cores of FIG. 1, they are still positioned so that the centerline 22 of the core 18 will be in alignment with the center of the tooth 16a when the centerline 24 of the core 20 is in alignment with the space 17 between the tooth 16a and the succeeding tooth 16b. The embodiment of FIG. 2 has an advantage over the embodiment of FIG. 1 in that the cores 18,20 are not formed as separate cores, but are formed as a part of a single piece of magnetic material with a connecting strip 50 which joins the cores 18,20. This construction eliminates the need for elaborate temperature matching and selection of the cores 18,20, since by being constructed from the same piece of ferro-magnetic material their temperature characteristics will be substantially the same and will track one another.

The embodiments of FIGS. 3 and 4 provide a further improvement of the wheel sensing device of the present invention. In the embodiments of FIGS. 1 and 2, the return flux from the bias magnet 44 passed through the air paths 46,48 for a substantial portion of its length. As was recognized in the prior Bernin application, the sensitivity of a wheel sensing device may be improved by providing low magnetic reluctance return paths for the flux paths 46,48. In the embodiments of FIGS. 3 and 4, this low magnetic reluctance return path is provided by a U-shaped magnetic member 52 which has closed-loop apertures 55,57 at its ends to receive the windings 28,32 of the four-arm active bridge circuit of FIG. 5. The closed-loop apertures 55,57 in the legs 54,56 of the member 52 provide closed-loop A.C. flux paths for the alternating magnetic flux created by the oscillator 34. Simultaneously, a low magnetic reluctance flux path through the legs 54,56 and the center bar 59 is provided for the magnetic bias or D.C. flux paths 46,48. The center bar 59 preferably is in contact with the bias magnet 44, as shown in FIGS. 3 and 4. The cores 18,20, thus, require only a single winding in the embodiments of FIGS. 3 and 4. A flux closure member, such as the member 52 without the apertures 55,57, may also be used with the embodiments of FIGS. 1 and 2, if desired.

In FIG. 3 it is seen that the leg 54 is positioned so that its centerline 60 will be in alignment with the center of the tooth 16c, which is the tooth that proceeds the tooth 16a past the cores 18,20, when the leg 58 has its centerline 62 positioned in the center of the space 27 between the tooth 16b and the tooth 16d. The width of the spaces 17 of the wheel 14 are preferably the same as the width of the teeth 16. The centerline 22 of the core 18 and the centerline 60 of the leg 54 are preferably spaced apart by the width of two teeth, as are the centerline 24 of the core 20 and the centerline 62 of the leg 56. The dimensions of the cores 18,20 and the teeth 16 are preferably arranged to provide this spacing so that the core 18 and the leg 54 will carry maximum flux when the core 20 and the leg 56 carry minimum flux; and vice-versa.

FIG. 4 shows an embodiment which is similar to the embodiment shown in FIG. 2 in that the cores 18,20 are generally rectangular and are made of a single piece of core material in order to reduce the temperature variation that would be caused by utilization of two separate toroidal cores, as in the embodiment of FIG. 3. The apertures 55,57 in the legs 54,56 in the embodiment of FIG. 4 are also rotated 90° with respect to the orientation of the apertures 55,57 of the embodiment of FIG. 3. The electrical operation of the embodiments of FIGS. 3 and 4, however, will be essentially the same except for the previously mentioned temperature variation reduction achieved in the embodiment of FIG. 4.

It will be apparent from the foregoing to those skilled in the art that the invention permits of a great variety of modifications and combinations of the individual system components and hence may be embodied in apparatus other than those specifically illustrated and described, without departing from the essential features of the invention and within the scope of the claims annexed hereto:

The invention is claimed as follows:

1. In a velocity sensing device for sensing the velocity of a rotating member having a plurality of projections of substantially equal width separated by spaces of substantially equal width on its periphery with said projections being capable of conducting magnetic flux to create a time-varying magnetic field comprising a four-arm, four-terminal active bridge circuit sensing means that comprises a pair of magnetic cores positioned adjacent the periphery of said rotating member, a first winding on one of said cores, a second winding on the other of said cores, third and fourth windings which are interconnected with each other and with said first and said second windings to form said bridge circuit, the center line of a first one of said cores being aligned with the center line of a first one of said projections when the center line of the second one of said cores is approximately aligned with the center line of the space between said first one of said projections and the next adjacent projection, and excitation generator means coupled to supply a carrier signal across two terminals of said bridge circuit, so as to provide an output signal across the other two terminals of said bridge circuit; the improvement comprising a magnetically permeable flux closure member positioned adjacent said cores and having first and second legs and a section that joins said legs, said first leg having a first aperture therein and said second leg having a second aperture therein constructed so as to receive said third winding through said first aperture and said fourth winding through said second aperture and so that the center lines of said legs are spaced such that the center line of said first leg is aligned with the center line of the projection that precedes said first one of said projections when the center line of said second leg is approximately aligned with the center line of the space that succeeds said space between said first one of said projections and said next adjacent projection.

* * * * *